United States Patent Office 3,393,210
Patented July 16, 1968

3,393,210
POLYCARBONAMIDES OF BIS(PARA - AMINOCY-CLOHEXYL)METHANE AND DODECANEDIOIC ACID
Stanley B. Speck, Wilmington, Del., assignor to E. I. du Pont de Nemours and Company, Wilmington, Del., a corporation of Delaware
No Drawing. Continuation-in-part of application Ser. No. 391,788, Aug. 24, 1964. This application Feb. 23, 1967, Ser. No. 617,804
16 Claims. (Cl. 260—371)

ABSTRACT OF THE DISCLOSURE

A class of fiber-forming polycarbonamides (including copolycarbonamides) typified by a polymer of the recurring unit:

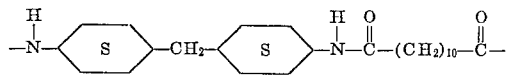

Filaments of these polymers are susceptible to relatively large crystallinity increases upon annealing, making them particularly useful in operations requiring them to be "set" in any predetermined configuration by thermal treatment.

CROSS-REFERENCE TO RELATED APPLICATIONS

This application is a continuation-in-part of U.S. application S.N. 391,788, filed Aug. 24, 1964.

BACKGROUND OF THE INVENTION

(1) Field of the invention

The invention relates to a novel and useful linear polyamide of fiber-forming molecular weight, especially suitable for molding, extruding and melt-spinning to fibers.

(2) Description of the prior art

Each of U.S. Patents 2,512,606 and 2,585,163 disclose polyamides from bis(para - aminocyclohexyl)methane; polyamides from such diamines and dodecane dioic acid are not taught by either of the references. U.S. Patent 2,625,536 relates to a process for preparing polyamides. Dodecane dioic acid and bis(para-aminocyclohexyl) methane are mentioned as suitable starting materials. There is no suggestion that these particular reactants be combined.

STATEMENT OF THE INVENTION

In accordance with the present invention a linear, high molecular weight polycarbonamide of at least about 0.8 inherent viscosity wherein recurring carbonamide linkages are an integral part of the polymer chain is provided wherein at least 70% by weight of the repeating units of the said polycarbonamide are of the formula:

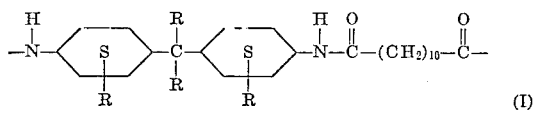

—("G-PACM" radical)—("12" acid radical)— wherein R is the same or different member of the class consisting of hydrogen and methyl, at least 40% by weight of the diamino constituent of the repeating units of the Formula I being of a trans-trans stereoisomeric configuration, any copolymeric unit when present being a divalent organic radical containing from about 4 to about 20 carbon atoms, the said divalent radical being joined into the linear polymer chain as an integral part thereof by radicals from the class consisting of amino and carbonyl. By "divalent organic radical" is meant divalent radicals, bonded to the amino or carbonyl radicals through carbon, which radicals are predominantly hydrocarbon, but which (1) may be chain-interrupted by hetero atoms such as oxygen or sulfur, and/or (2) may have substituents for hydrogen which include radicals such as sulfonate, sulfate, phosphate, phosphinate, hydroxyl, acyl, and the like. The preferred polyamide of the present invention is the reaction product of dodecane dioic acid (i.e., the "12" acid) and bis(para-aminocyclohexyl)methane (abbreviated PACM herein) or their amide-forming derivatives (i.e., R of Formula I is hydrogen). The generic amino entity illustrated above, i.e., including substituted PACM will be referred to herein as "G-PACM" or "PACM polyamides." The diamine, due to its carbocyclic nature, is a mixture of isomers, having trans-trans (tt), cis-trans (ct) and cis-cis (cc) configurations. Hydrogenation conditions used in preparing G–PACM result in a mixture of isomers, different conditions of hydrogenation producing different isomer distribution, as shown in U.S. 2,494,563 and U.S. 2,606,924, for example.

Annealing or relaxing treatments of relatively short duration of filaments formed from the polymer of the present invention produces a five-fold or more increase in their crystallinity. For this reason these filaments are especially suitable as components of structures susceptible to thermal setting treatments such as the heat-setting of fabrics on a tenter frame or for high-speed texturing processes which require the terminal setting of twist in a yarn followed by untwisting to give a helically crimped or bulky yarn suitable for stretch fabrics. For high speed texturing response, PACM of 55 to 85% tt is preferred.

In contrast, the structurally similar fiber from PACM–10 polymer is so slow to crystallize that it is not suitable for these high-speed texturing processes. This is surprising, since the literature teaches that ease of crystallization increases with decreasing length of structural repeat units (see C. W. Bunn in R. Hill (ed.); Fibres From Synthetic Polymers, pp. 246–7, Elsevier, 1953). From this and other publications, it would be expected that PACM–12 would be more difficult to crystallize than PACM–10.

DEFINITIONS, STANDARDS AND TEST PROCEDURES

The following examples, in which percentages are by weight unless otherwise indicated, are intended to illustrate the invention. They are not intended to limit it in any way.

Unless otherwise indicated, the fibers described in the examples are drawn to about the same degree of orientation, which is measured by the birefringence of the drawn yarn, or more conveniently, by the break elongation of the drawn yarn measured on the filaments as-drawn, prior to heat treatments such as annealing, heat setting, boil-off and the like, since these heat treatments affect the refractive index perpendicular to the fiber axis by changing the extent of hydrogen bonding. For the comparative tests, yarns are drawn to a break elongation of $15 \pm 2\%$, before being subjected to scour or heat-setting treatments.

The crimp index is determined by measuring the crimped length (C) of a 5,000 denier skein of dried and conditioned yarn after it has been boiled-off for 15 minutes under a 5 mgm./den. load; the extended length (E) is determined by increasing the load on the skein to 100 mgm./den. The percent index is then calculated from the expression:

$$\text{Crimp Index} = \frac{E-C}{E} \times 100$$

G–PACM–12 yarns as drawn have very little lateral crystal order, showing but little crystallinity. Their Bragg X-ray crystal diagram is characterized by amorphous diffraction on the equator and a single strong meridional reflection which corresponds to diffraction from the second layer line of such crystals as are present. This crystal form is called "A" crystal, for convenience. High temperature annealing increases the amount of A crystal, as shown by the appearance of another meridional spot close to the beam stop of the X-ray diagram. On further annealing, the more central spot (1) increases in intensity at the expense of the spot (2) more distant from the beam stop. The relative intensity of these two spots is a measure of the crystallinity of the yarn sample, which can be conveniently given a number, termed "crystallinity index" herein. The intensity of the two spots is determined from a radial densitometer trace of the X-ray diagram. The intensity of spot (1) divided by the intensity of (2) gives a ratio which is proportional to the crystallinity index; the index values range from 0 to 100. When the two spots have equal intensities, the index is 50.

The work recovery (WR) of a fiber subjected to stretching is useful in characterizing its wrinkle resistance. Work recovery at 3% stretch is employed herein.

The growth of a yarn is determined by measuring the length of the yarn specimen, subjecting the specimen to a specified load for 30 minutes and then remeasuring the length. The growth is reported as the percent change in length based on the initial specimen length. The growth of a yarn includes a short term elongation (e.g., after 30 seconds) and an additional longer term elongation (e.g., after 30 minutes) under the specified load. The elongation occurring between 30 seconds after loading and 30 minutes after loading is termed "creep." This value is reported herein as a percentage length change, based on the original (before loading) lengths of yarn. Prior to measuring growth at room temperature, the yarn is allowed to relax for 48 hours at no load at 25° C., 55% relative humidity. The "hot growth" samples are allowed to relax for 15 minutes in the oven at the specified temperature, prior to measuring and testing.

By "high molecular weight" as used herein is meant that the polymer has an inherent viscosity of at least about 0.8 (measured at 25° C. in a solution containing 0.5 gms. polymer in 100 cc. m-cresol. An equally useful solvent is a 1:1 mixture (wt. basis) of 90–100% formic acid and phenol). Such polymer will have a number average molecular weight of at least about 9,000, based on end-group analysis. For most desirable fiber properties, the molecular weight should be at least about 14,000, corresponding to an inherent viscosity of at least about 1.1. For the highest level of fiber properties, at 70% and higher tt, a mol. wt. of at least 20,000, corresponding to an inherent viscosity of at least about 1.4, is preferred.

EXAMPLE 1.—CRYSTALLIZABILITY V. TEXTURING RESPONSE; PACM–12 V. PACM–10

An autoclave equipped with a stirrer is purged with $N_2$ and charged with 17.2 parts water, 9.36 parts dodecanedioic acid, and a total of 9.633 parts of a methanol solution containing 85.8% of bis(4-aminocyclohexyl)methane (55% tt isomer; it should be noted that regardless of the relative amounts of tt and ct isomers, the amount of cc. does not vary greatly from about 5%; thus, giving the tt content of any isomer mixture effectively identifies it). The autoclave is heated to 135° C., and held at this temperature for 30 minutes, then heated until the pressure is 50 p.s.i.g.; about 10 parts $H_2O$ and methanol is removed at this pressure. To the autoclave are then added 0.175 part of 0.8 mol percent aqueous acetic acid and 0.0396 part of 0.005 wt. percent aqueous manganous hypophosphite. The autoclave temperature is raised to 285° C., then steam is bled off over a period of 90 minutes until the pressure is 1 atm., while the temperature is increased to 310° C. The clave is held at this temperature for 1½ hours, while it is purged with flowing $N_2$ at 0.5 cu. ft./min. The polymer, having a 12,000 average molecular weight, is then extruded from the clave under $N_2$ pressure, and is cut to ⅜" flake.

PACM–12 filaments (Yarn A) are prepared from the above polymer by spinning a 34-filament yarn at 300° C. and drawing 3X immediately following spinning using a 100° C. snubbing pin. The drawn yarn (about 70 denier) as a tenacity of 3.6 g.p.d. and an elongation of 30%. This yarn is textured using the process of U.S. Patent 2,803,109 dated Aug. 20, 1957, on a commercial Model 552 "Superloft" machine (Leesona Corp., Warwick, R.I.) at 80 turns per inch, 140,000 r.p.m. spindle speed, +3.0% overfeed to the heater. Heater temperatures are varied from 160° to 238° C., to determine conditions under which acceptable yarns of maximum crimp index are produced. It is observed that maximum crimp index is obtained at heater temperatures of 204° C. Above 204° C., the yarn has non-bulked regions due to filament fusing. After the optimum treatment Yarn A has a crystallinity of 21 and a crimp index of 26.2%, showing an excellent texturing response.

For comparison purposes, a similar, 34-filament PACM–10 yarn (Yarn B) is prepared from 55% tt PACM–10 polymer of 15,000 (calculated) mol. wt. by spinning at 312° C., then drawing 3X using an 125° C. pin followed by a hot pipe at 160° C. (input), 170° C. (center) and 190° C. (exit). A hot pipe is used in drawing the yarn of this polymer to provide initial crystallinity (4 to 5) comparable to that of the PACM–12. This level of crystallinity is required for PACM–10 filaments to minimize fusing during the texturing treatments. The 76-denier yarn has a tenacity of 3.9 g.p.d. and an elongation of 38%. Yarn B is textured just like A, using maximum heater temperature, which in this case is 177° C. Above 177° C. the yarn fuses. The yarn has a crystallinity of only 5 and a crimp index of only 5.2%. The crimp index of similarly textured 2 denier per filament polyhexamethylene adipamide is typically 10%.

EXAMPLE 2.—CRYSTALLIZATION RATE; PACM–12 V. PACM–10

As demonstrated in Example 1, the ability to develop crystallinity of drawn polyamide filaments by heat treatment is a property reflecting the degree to which such filaments can be set in any predetermined configuration by thermal treatments. This example illustrates the extent to which crystallinity can be developed by annealing the yarns of the present invention versus PACM–10 using a series of yarns prepared from various polymers and copolymers of PACM and the acids indicated in Table I. Drawing conditions, initial crystallinity, and crystallinity after annealing are also given in the table. Higher annealing temperatures are used for higher tt PACM polymers. Annealing temperatures which are too high, making the yarn yellow, are indicated by (Y). Otherwise the yarns are white. Crystallinity indices are reported with an accuracy of ±1 unit.

TABLE I

| | Percent tt | Diacid [1] | Mol Ratio of Acids | Drawing Conditions | | | Crystallinity Index | | | | |
|---|---|---|---|---|---|---|---|---|---|---|---|
| | | | | Draw Ratio | Pin Temp., °C. | Plate Temp., °C. | As Drawn | Annealing Temp.[2] | | | |
| | | | | | | | | 180° C. | 200° C. | 225° C. | 250° C. |
| Test: | | | | | | | | | | | |
| A | 45 | –12 | 100 | 3.3 | 70–77 | [3] 100 | 5 | 43 | 59 (Y) | | |
| B | 45 | –10 | 100 | 2.7 | 70–77 | [3] 120 | 4 | 11(Y) | 39(Y) | | |
| C | 70 | –12 | 100 | 3.9 | 90 | 160 | 7 | | 55 | 63 | |
| D | 70 | –10 | 100 | 3.7 | 90 | 180 | 0 | | 7 | 9 | |
| E | 70 | –12/–9 | 75/25 | 3.6 | 95 | 155 | 30 | | 72 | 75 | |
| F | 70 | –12/–10 | 75/25 | 3.7 | 100 | 150 | 10 | | 62 | 68 | |
| G | 70 | –12/–14 | 75/25 | 3.5 | 100 | 150 | 15 | | 74 | 76 | |
| H | 70 | –12/–16 | 75/25 | 3.6 | 100 | 150 | 30 | | 78 | 80 | |
| I | 90 | –12 | 100 | 3.9 | 150 | | 11 | | 54 | 70(Y) | 78(Y) |
| J | 100 | –12 | 100 | 2.3 | 110 | 150 | 8 | | 41 | 65 | 81(Y) |
| K | 97 | –10 | 100 | 2.8 | 110 | 200 | 6 | | 4 | 18 | 36(Y) |

[1] The number indicates the number of carbon atoms in the aliphatic diacid. [2] The yarns are allowed to relax 5% after 2 minutes at the annealing temperature. [3] Drawing followed by an annealing plate at 150° C.

The crystallization rate of PACM–10 filaments is much lower than PACM–12 at all tt levels, and this low rate is not overcome by higher annealing temperatures, which are also accompanied by yellowing of the yarn. These data show that fabrics from these PACM–12 will respond readily to processes depending on heat setting.

then the tubes are opened and heated under steam at one atmosphere for 2 hours at 305° C. Yarn is spun from these polymers. Process conditions, where varied, are indicated in Table II, along with polymer analysis and yarn treating conditions. All yarns are drawn to have a 14 to 16% break elongation, and are given identical boil-off and heat setting treatment.

TABLE II

| Sample | A | B | C | D | E | F |
|---|---|---|---|---|---|---|
| | Polymer | | | | | |
| | PACM–9 | PACM–10 | PACM–11 | PACM–12 | PACM–13 | PACM–14 |
| Stabilizer (mole percent) | ([1]) | ([2]) | ([3]) | ([4]) | ([5]) | ([2]) |
| TiO₂, percent | 0.4 | ([6]) | ([6]) | 0.4 | ([6]) | ([6]) |
| Polymer Finishing Temp., °C | 320 | 326 | 305 | 320 | 305 | 305 |
| Inherent Viscosity | 0.82 | 0.96 | [7] 0.84 | 0.77 | 1.43 | 1.10 |
| Mol. Wt., number average | 10,000 | | 15,700 | 10,000 | | 14,400 |
| Spin Temp., °C | 315 | 352 | 306 | 310 | 350 | 341 |
| Draw Ratio | 2.9 | [8] 3.7 | 3.0 | 2.8 | 3.0 | 4.1 |
| Pin Temp., °C | 70–77 | 90 | 90 | 70–77 | 90 | 90 |
| Plate Temp., °C | 120 | 180 | 180 | 120 | 180 | 160 |
| Annealing Shoe, °C | 175 | ([6]) | ([6]) | 175 | ([6]) | ([6]) |

[1] 1.6% pelargonic acid. [2] 0.1% acetic acid. [3] 1% PACM-diacetate. [4] 1.75% acetic acid. [5] 0.5% PACM-diacetate. [6] None. [7] Yarn viscosity. [8] Drawn to give yarn having 10% elongation.

EXAMPLE 3.—COMPARISON: WORK RECOVERY PROPERTIES

A polymer is prepared in an autoclave containing 50 parts water and 50 parts of the salt of 70 tt bis-(para-amincyclohexyl) methane and dodecane dioic acid.

As viscosity stabilizer, 17.5 millimoles of cetic acid are added for every mole of the polyamide salt (1.75 mole percent). The mixture in the clave also contains 0.4% TiO₂ and 0.005% manganous hypophosphite, based on weight of salt. This mixture is heated under 350 lbs./inch² pressure for two hours while the temperature is raised to 285° C. The pressure is then reduced to atmospheric while the temperature is raised to 315° C. and the polymer held under these conditions for one hour. It is then extruded and cut to flake. The polymer is melted and filaments are extruded at a temperature of 315° C. through a spinneret. The yarn is then drawn 2.8 times its extruded length over a snubbing pin at a temperature of 70 to 77° C., and a hot plate at 120° C. The yarn is then subjected to a constant length anneal by passing over a plate heated to 175° C.

After scouring for 15 min. at the boil, under 4 mg./den. tension, the yarn is heat set for 1 minute at 180° C., allowing a maximum of 2% shrinkage. It is then subjected to work recovery tests with the results shown in Table 2.

Polymer is prepared similarly from 70% tt PACM, polymerized with 9, 10, 11, 13 and 14 carbon diacids except that no manganese hypophosphite is added in the case of PACM–11, –13, and –14, polymer is prepared in multiple batches, in glass tubes. In the glass tube preparations, salt and stabilizer are sealed in the glass tube under nitrogen, after purging under vacuum. The salt is heated for two hours between 230 and 235° C., Work recovery properties (median values at 3% dry) of the yarns prepared as described above are reported in Table III.

TABLE III

Polymer: Percent work recovery
PACM–9 ------------------------------------ 66
PACM–10 ----------------------------------- 73
PACM–11 ----------------------------------- 71
PACM–12 ----------------------------------- 78
PACM–13 ----------------------------------- 78
PACM–14 ----------------------------------- 76

From the values of Table III it will be seen that PACM–12 possesses a high level of work recovery when compared with closely related polymers.

EXAMPLE 4.—PREPARATION OF 50 tt PACM-12

PACM–12 salt is prepared by adding 171 gm. PACM of about 50% tt isomer content in 350 cc. ethanol to 180 gm. –12 acid in 1500 cc. ethanol. The solution is cooled, the precipitated salt is filtered off and washed with ethanol at room temperature. The combined yield of two such runs is 594 gm. The salt (containing a slight excess of the diamine) has a pH of 8.1.

Seventy-five grams of the PACM–12 salt and 7.7 cc. of 1% acetic acid (0.75 mol percent, based on salt) are placed in a glass tube, flushed with N₂, then sealed and heated for 2 hours at 235° C. The tube is then opened and heated for 2 hours longer at 310° C. in a N₂ atmosphere. Seven such runs are made. The combined polymer from these runs has an inherent viscosity (meta-cresol) of 1.03, 39 equivalents of amine ends and 95 equivalents of carboxyl ends per 10⁶ grams polymer.

The polymer is melted using a screw melter at 320° C. and is spun at a temperature of 325° C. The yarn is drawn three times its extruded length, using a hot pin at 120° C. to form a 69 denier yarn with a tenacity of 3.7 gm./den. and an elongation of 20–24%. After scouring and heat-setting at 180° C., the yarn has a tenacity of 2.9 gm./den., a break elongation of 36%, and a work recovery at 3% stretch of 76%.

EXAMPLE 5.—PREPARATIONS OF OTHER EMBODIMENTS

Following the procedure of Example 3, a polyamide is prepared by reacting dodecane dioic acid with 2,2-di(p-aminocyclohexyl)propane (abbreviated PACP, for convenience). The PACP contains 68% of the tt isomer. The polymer has an inherent viscosity of 1.1. The polymer is spun to yarn, which is thereafter drawn 4.2 times as in Example 3, then boiled off and heat set at 150° C. for 3 minutes. The PACP–12 yarn has an 82% work recovery (dry–3%) which compares with a value of 74% for a PACP–10 yarn (67% tt).

In a similar manner polymer and yarn therefrom is prepared from dodecane dioic acid with (A) bis(4-amino-3-methylcyclohexyl)methane, (3MePACM) of 100% tt isomer content and (B), bis(4-amino-2-methylcyclohexyl)methane, (2MePACM) of 57% tt. The 3MePACM–12 is polymerized for 2 hours in a sealed tube at 270° C., then under $N_2$ for 1.5 hours and under vacuum for ½ hour at 305° C. A polymer is obtained having a melting point of 290° C. and a relative viscosity of 27 (equivalent to a molecular weight of over 9,500). Filaments from this polymer have a 3% work recovery of 75%. The 2MePACM–12 is heated in a sealed tube for 1 hour at 250° C., then for 1 hour at 283° C. The 2MePACM–12 has a molecular weight of 9,900 and is spun into fiber at 260° C. The 3.3X drawn fiber has a 3% work recovery of 77% after scouring under 1.5 mgm./den. load, followed by heat setting.

EXAMPLE 6.—COPOLYMERS

Following the procedure of Example 3 used for preparing PACM–12 except for variations in polymer conditions noted in Table IV, polymer from PACM–12 and various copolymer components is prepared, using 70% tt diamine unless otherwise indicated. The polymer is spun and drawn to yarn which is then scoured, heat set as in Example 3, unless otherwise indicated, and subjected to work recovery tests. Copolymeric units and processing conditions are listed in Table IV and yarn property observations in Table V. Copolymer compositions (in weight percent) are calculated as weight of PACM–X per 100 grams of polymer, where X represents the acid entity of the foreign component. The acids used are alpha-omega dibasic and unbranched, the numerals indicating total carbon atoms.

TABLE V

| | Tenacity | Elongation | Work Recovery (3% dry) |
|---|---|---|---|
| Sample: | | | |
| A | 3.8 | 19 | 81 |
| B [1] | 3.9 | 29 | 66 |
| C [1] | 3.7 | 29 | 66 |
| D | 3.5 | 16 | 73 |
| E | 3.5 | 27 | 74 |
| F | 3.0 | 27 | 74 |
| G | 2.7 | 30 | 76 |
| H | 2.6 | 15 | 80 |
| I | 2.4 | 22 | 82 |
| J | 2.6 | 25 | 81 |

[1] Scoured under 8 mgm./den. load, then heat-set 2 min. at 180° C. before testing.

In general the introduction of copolymeric units which contain rings, particularly PACM or isophthaloyl (I) units, causes less decrease in work recovery than the introduction of aliphatic structural units, except for the 9–11 and 13–16 dicarboxylic acids. It has been observed that G–PACM–12 polymers can accept up to 30% by weight of these components with little or no loss in fiber properties. The introduction of foreign components into the polymer chain of Formula I disturbs the regularity of the repeat units in the chain, and prevents the chains from packing as closely together as they would in the homopolymer. This behavior is typical of crystallizable homopolyamides. However, the Formula I polymer chain is unusual in that the length of the structural repeating unit in the direction parallel to the fiber axis is appreciably shorter than that calculated from the structure of model amides. It is postulated that the molecular chains are therefore not fully extended, which would account for the high tolerance for the 9–11 and 13–16 acids.

EXAMPLE 7.—THERMAL STABILITY

The filaments of this invention have a high degree of thermal stability; thus, they are especially suitable for use as tire reinforcement yarn, due to low growth and creep, especially at tire operating temperature (77° C.). Moreover, in the 70 to 100% tt range, the PACM–12 yarns show unexpectedly low shrinkage compared to PACM–12 yarns of lower tt, when subjected to extremely rapid heating, used, for example, in heat-setting, edge-crimping or calendering.

Yarn is spun from 70 tt PACM–12 polymer of 19,800 mol. wt. at a temperature of 306° C. The yarn is drawn 3.9X over a hot pin at 90° C. and a hot plate at 180° C. The yarn has a break elongation of about 12%. When tested at 77° C. and 1 gm./den. load, the growth is 1.60% and the creep is 0.47.

Small skeins of known length of as-drawn PACM–12 yarn prepared as described above, using PACM–12 of varying tt content, are immersed in mineral oil heated to

TABLE IV

| | Copolymer Component [1] | Inh. Visc. | Est. Mol. Wt. | Spin Temp., °C. | Draw Ratio | Temps., °C. Pin | Temps., °C. Plate |
|---|---|---|---|---|---|---|---|
| Sample: | | | | | | | |
| A [2] | None | 1.13 | 13,500 | 362 | 2.8 | 110 | 200 |
| B | 5% 6–I | 0.85 | 10,300 | 300 | 3.40 | [3] 120 | 170 |
| C | 5% 6 | 1.04 | 12,600 | 315 | 2.9 | 120 | 170 |
| D | 10% PACM–I | 0.94 | 13,600 | 320 | 3.6 | 110 | 170 |
| E | 10% HPP–12 | 1.10 | | 320 | 3.8 | 100 | 160 |
| F [2] | 20% PACM–9 | 1.14 | | 348 | 3.2 | 100 | 170 |
| G | 23% PACM–9 | 1.05 | | 349 | 3.6 | 95 | 155 |
| H [2] | 20% PACM–14 | 0.81 | | 340 | 3.6 | 100 | 170 |
| I | 26% PACM–14 | 1.21 | | 393 | 3.6 | 100 | 150 |
| J | 27% PACM–16 | 1.15 | | 345 | 3.6 | 100 | 150 |

[1] Percent by weight, based on weight of copolymer component in total polymer; "6" is caprolactam; "I" is the isophthaloyl radical; HPP is bi(4-aminocyclohexyl) of 40% tt isomer content.
[2] PACM of 97 tt.
[3] Hot plate instead of pin.

200° C. The shrinkage observed is given below in Table VI.

TABLE VI

| Sample | tt level, percent | Shrinkage, percent |
|---|---|---|
| A | 55 | 40 |
| B | 70 | 6.2 |
| C | 97 | 5.5 |

EXAMPLE 8.—MOLDED ARTICLES

PACM–12 is transparent, and molded structures formed from it show, as compared to 66 nylon, high retention of flex modulus at high humidity despite a relatively high (2.7% at 100% R.H.) moisture absorption, good resistance to compressive stress, relatively little variation in electrical properties as a result of humidity changes, good hardness and coefficient of friction properties, in spite of a relatively low modulus and good toughness. The PACM–12 polymers of Tables VII and VIII have inherent viscosities of from 1.05 to 1.21 and are prepared substantially following the techniques of the 70 tt PACM–12 of Example 3. All test procedures used in obtaining the results of these tables are recognized ASTM procedures. Unless otherwise noted, the PACM–12 polymers are prepared from PACM containing 70% by weight of the "tt" stereoisomer.

TABLE VII

| Property [1] | 55 tt (M.W. 17,500) | 70 tt (M.W. 14,600) |
|---|---|---|
| Flex Modulus (p.s.i.): | | |
| Dry (as molded) | 220,000 | 228,000 |
| 50% RH | 231,000 | 230,000 |
| 100% RH | 232,000 | 224,000 |
| Tensile Yield Stress, p.s.i., 23° C | | 9,200 |
| Compressive Yield Stress, p.s.i., 23° C | | 13,800 |
| Deformation Under Load, 50° C., 2,000 p.s.i., 24 hrs., percent | | 0.14 |
| Tensile Impact Strength, ft.-lbs./in.$^2$, 23° C., median | 187 | 177 |
| Izod Impact Strength, ft.-lbs./in., 23° C., notched 1/8" bar | 1.7 | 2.1 |
| Brittleness Temp., ° C | −112 | −115 |

[1] Measured "dry, as molded" unless otherwise indicated.

TABLE VIII

| Property | Dry (as molded) | 50% R.H. | 100% R.H. |
|---|---|---|---|
| Rockwell Hardness: | | | |
| M | 66 | 88 | 74 |
| R | 122 | 125 | 122 |
| Dielectric Constant: | | | |
| $10^2$ cps | 3.64 | 3.79 | 4.33 |
| $10^3$ | 3.66 | 3.75 | 4.24 |
| $10^4$ | 3.49 | 3.59 | 4.02 |
| $10^5$ | 3.35 | 3.68 | 3.81 |
| $10^6$ | 3.27 | | 3.62 |
| Dissipation Factor: | | | |
| $10^2$ | 0.0098 | .00969 | .0098 |
| $10^3$ | 0.0207 | .0212 | .0230 |
| $10^4$ | 0.0301 | .0258 | .0330 |
| $10^5$ | 0.0248 | .0313 | .0350 |
| $10^6$ | 0.0202 | | .0341 |
| Short-Time breakdown, v./mil | | 381 | 346 |
| Vol. Resistivity, ohm-cm | 9.1×10$^{15}$ | 8.0×10$^{15}$ | 5.0×10$^{15}$ |
| Percent H$_2$O absorbed | | 1.3 | 1.7 |

From the above, it is apparent that molded or extruded articles of PACM–12 exhibit an unusual combination of properties in that they are useful to meet applications requiring high temperature performance, toughness, and transparency (usually associated with low melting point, solvent sensitivity or brittleness). Still another feature is the insensitivity of mechanical properties to increasing moisture content. Moduli and electrical properties are essentially unchanged and fatigue properties are only slightly changed with increasing moisture levels. PACM–12 is useful to make transparent tough film.

A useful glass fiber-reinforced molded structure is prepared by dry blending 1/8" cubes of 70% tt PACM–12 polymer with chopped glass fiber approximately 1/4" long. The dry blend is fed to a 1½" diameter extruder with a vented section operating with a reduced pressure of 25 to 30 inch mercury vacuum. The extruder screw is rotated at 50 r.p.m. to achieve rates of approximately 12 lbs./hr. of the composite structure. The extrudate is chopped into molding powder and injection molded into standard test bars 6½" in length containing 33% by weight glass. These bars tested in the dry as molded condition are found to have a tensile strength of 21,700 p.s.i. and a modulus of 0.89×10$^6$ p.s.i. When bars prepared in the same way are immersed in boiling water for 48 hours, they are found to have a tensile strength of 19,500 p.s.i. and a modulus of 0.82×10$^6$ p.s.i. If the glass fiber is precoated with 3% of a polyamide terpolymer of 6, 66 and 6–10, from a methanol solution, cut to ½" length and blended with 1/8" cubes of PACM–12 polymer and the blend is molded directly to provide a bar containing 40% by weight, the wet tensile strength is 17,800 p.s.i., and the modulus is 1.15×10$^6$ p.s.i.

Polymer preparation

The PACM polyamides of this invention are prepared using conventional melt polymerization procedures, except that temperatures of over 280° C. are generally required. As the tt content of the PACM is increased, polymer finishing temperature must exceed 300° C. Fortunately, G–PACM–12 polyamide in the absence of oxygen is exceedingly stable at high temperatures; thus, PACM–12 of 100% tt is readily brought to spinning molecular weight at temperatures of up to about 340° C. To attain the greater than 18,000 molecular weight required for the best level of properties for fibers and injection molding, vacuum finishing in an agitated vessel is required. Preparation by continuous polymerization is quite practical.

Copolymers

It has been found that the polyamides of this invention will "accept" up to 30% of G–PACM–9 to –11 and G–PACM–13 to –16 as copolymer components with the repeating unit of Formula I. Such copolymer component units will have the formula:

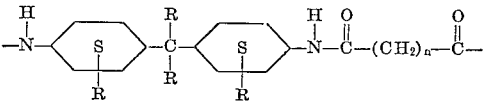

wherein R has the significance set forth above and $n$ is an integer of from 7 to 9 and 11 to 14. These copolymer units are "accepted" in that up to 30 wt. percent may be added without serious loss in recovery properties, crystallinity or polymer melting point. It is believed that the unextended polymer chains permit this "tolerance" of copolymer units having nearly the same unit length, so that the copolymer acts as if it were isomorphous. This "tolerance" is not shown by 66 nylon copolymers for example, where the repeat units must be exactly the same (e.g., 66/6T copolymer, where T is terephthalic acid) for isomorphism to exist.

Except for the G–PACM–9 to –11 and G–PACM–13 to –16 copolymeric units discussed above, copolymer components, whether the foreign component replaces the amine, the acid or both, should preferably be kept to no more than about 5% by weight (calculated as the weight, per 100 grams of polymer, of G–PACM–X, Y–12, or Z, where X refers to the acid entity in the foreign component, Y refers to the amine entity and Z refers to an amino acid component) in order to retain the superior recovery properties of G–PACM–12 yarns, unless a carbocyclic ring is present as an –X or –Y entity, in which event 10% of the foreign component may be tolerated as is demonstrated in Example 6. Suitable diamines for copolymerizing as Y–12 foreign components with G–PACM–12 are diprimary or disecondary diamines, especially the alpha-omega aliphatic diamines of 2 and preferably 6 to 14 carbon atoms, such as hexamethylene diamine; 2-methylhexamethylene diamine; tetramethylhexamethylene diamine; 2,5-dimethyl hexamethylene diamine; di(aminopentyl)ether and di(aminopentyl)sulfide. Ring-containing diamines include piperazine, substituted piperazines such as dimethyl piperazine; meta- or para-xylylene diamine; 4,6-dimethylxylylenediamine; paraphenylene diamine; 4,6-dimethyl paraphenylene diamine; 4,4'-diaminodicyclohexyl propane-2; 1,4-diaminomethylcyclohexane; 1,4-diamino-2,3-dimethylcyclohexane; 1,4 - cyclohexanediamine, and bis(2-sulfo-4-aminocyclohexyl)methane. Among suitable diacids for copolymerizing as G–PACM–X components with G–PACM–12 are alpha-omega aliphatic acids of 2 to 11 and 13 to 16 carbon atoms; aromatic acids such as terephthalic acid, isophthalic acid, sulfonated isophthalic acid, para-phenylene diacetic acid, bibenzoic acid, 2-methyl terephthalic acid, and 1,4-cyclohexane dicarboxylic acid; 5,5'-thiodivaleric acid; 5,5'-oxydivaleric acid; di(4-carboxycyclohexyl); bis(4-carboxycyclohexyl)methane; and bis(3 - methyl - 4 - carboxycyclohexyl)methane. Typical amino acids (or the corresponding lactams, when these exist) for copolymerizing as Z components with G–PACM–12 include alpha, omega amino acids of from 2 to 12 carbon atoms between the nitrogen and carbonyl carbon; typical intermediates are pyrrolidone, 6-aminohexanoic acid, ε-caprolactam, 11-aminoundecanoic acid and 12-aminododecanoic acid. Cyclic and/or aromatic amino acids may also be used, such as 4-piperidine carboxylic acid, m- or p-aminobenzoic acid, 4-aminocyclohexaneacetic acid, and 4' - amino-4-bisphenylcarboxylic acid, 4-amino-4'-carboxy(dicyclohexyl)methane; 4-aminocyclohexanoic acid; 3-aminocyclohexanoic acid.

Although conventional random copolymers have been described above, the G–PACM–12 polymers of this invention may also be blended with incompatible or compatible polymers to provide good fibers, for example, having an improved recovery without the usual decrease in melting point which is typical of random copolymers. When the melt blend of compatible polyamides is produced, the product will be a block copolyamide, due to amide interchange.

Yarn preparation

The yarns from G–PACM–12 polymers are prepared by melt spinning using conventional procedures. The desirable yarn structure is in part a function of trans-trans (tt) content of the diamine, and in part is dependent on the heat treatment the yarn receives subsequent to drawing. In general, the desirable structure is enhanced by a high temperature annealing treatment at costant length. Temperatures of 100 to 200° C. are suitable; usually, the lower temperature range will be preferred for the lower tt isomer content polymers due to their lower heat stability. It is believed that the most effective annealing temperature range is in the vicinity of or above 160° C. The yarn may be annealed on the package. This may be accomplished by placing the package in an oven containing an inert gas, air or steam atmosphere. Times of from one minute to one hour are satisfactory, primarily controlled by the time required for all yarn to reach the desired temperature. Preferably, however, the annealing treatment is done on the running yarn, immediately after drawing. Heating is suitably accomplished by yarn contact with a hot plate, pin or tube, or by heating in a radiant tube, fluid jet, molten metal or oil bath, fluidized bed, convection heated oven, or the like. Treatment should produce a yarn temperature of at least about 100° C. and preferably 150° C. Under these conditions, yarn contact times of 0.001 to 10 seconds are suitable.

The annealing treatment may be combined with a second stage of drawing, which may be followed with a partial relaxation step if desired. These steps may be performed as separate operations, with packaging steps intervening, or as a continuous sequence. Alternatively, yarn structure may be improved by relaxing treatments, which may be employed to treat skeins of yarn batchwise, but preferably are carried out on the run immediately following drawing. The heating means disclosed for annealing are suitable for relaxing. Superheated steam or hot air injected into a tube as taught by Pitzl in U.S. Patent No. 3,003,222 is satisfactory. The amount of relaxation should be controlled, and should be within the range of 5 to 20%.

Fibers of G–PACM–12 polymers are preferably oriented sufficiently to have a birefringence of at least 0.025, and preferably 0.035 to be suitable for most textile uses. Such fibers will have a tenacity at least about 2.0 and 2.6 gm. per den. and a break elongation of 65–75% and 40–50%, respectively, and are satisfactory for most textile uses. With greater orientation (higher birefringence), yarns of higher tenacity are produced, including yarns suitable for high-strength or industrial use. The orientation is produced partly in the spinning step and partly in a drawing step, as is well known for polyhexamethylene adipamide. Increased draw ratio gives increased orientation.

The fibers of the polymers of this invention follow the usual inverse relationship between tenacity and elongation, wherein fibers of low tenacity have a relatively high break elongation, and vice versa. Heat setting and especially relaxing treatments decrease shrinkage, increase break elongation and generally decrease tenacity.

It has been found that these polyamide fibers are conveniently dyed under pressure, and especially in the presence of carriers customarily used for polyester fiber. Suitable temperatures are from 115 to 120° C.

Effect of tt level

For G–PACM–12 polyamides, increasing the tt isomer content of the diamine increases heat stability of the polymer and improves the tensile and recovery properties of the yarn and reduces shrinkage in the yarn.

An increase in polymer viscosity improves tensile and recovery properties of yarns formed from the polymer although usually accompanied by an increase in shrinkage. Increased draw ratio has a similar effect. Increased annealing temperature (or time) increases structural stability and decreases shrinkage. Although fibers of G–PACM–12 of at least 40% trans-trans isomer content have excellent work recovery, both wet and dry, it has been found that fibers from such polymer with greater than about 65% tt have a very high wash-set recovery angle. These fibers also have a high level of dimensional stability, and are thus well suited for tire reinforcement. For example, they have a low growth and creep at room temperature as well as tire operating temperatures. Such fibers, especially of at least 70% tt content, retain their tenacity and especially their modulus at elevated temperatures or after exposure to high temperatures or to solvents, such as those used for dry cleaning. Indeed, some fluorinated solvents such as tetrafluoropropyl alcohol will dissolve PACM–13 or –14, but not PACM–12.

Utility

PACM–12 is suitable for casting, molding (compression or extrusion) and thermoforming operations in general. It may be extruded as tubes, rods, bars, bristles, structural shapes, sheet, plates or film. It may be shaped directly from the melt in molds, or it may be readily machined to final dimensions. It has been observed that the adhesive bond strength between PACM–12 polymer and glass is maintained to a high degree in the presence of moisture, despite the relatively high moisture absorption of the polymer. As a result of the retention of bond strength, glass fiber-reinforced molded structures retain mechanical properties to an unusual degree in moist environments. Asbestos fiber may also be used with beneficial effect.

Filaments of the polymer of this invention are suitable for use in continuous filament form, as staple, crimped tow, flock, or the like. They are especially useful for thermal treatments producing crimped or twist-set bulky yarns. They may be used as a sewing thread or in fabrics of woven, knitted, tufted pile, non-woven, or felted construction. They are useful for industrial yarn, especially where high modulus, high recovery fibers are required, such as for V-belts, tire cord, laminates and the like. The filaments may be used alone or may be plied or blended with other natural, synthetic or man-made fiber. The filaments of the invention may be dyed, printed, pigmented, bleached, grafted or the like. They may be textured, bulked, heat-set, twisted, crimped, or any combination of these processes. The polymers of the present invention have particular utility as one or both components of a mixed shrinkage yarn, i.e., a yarn of various and multiple filaments which filaments differ substantially among themselves in their shrinkage propensity, i.e., in a mixed filament (co-spun) yarn or as component in combined filaments spun in side-by-side or in sheath core arrangement.

Additives

The polymer of this invention may contain suitable heat stabilizers, antioxidants, light stabilizers, ultraviolet light absorbers, delusterants, pigments, dyes, and the like. Other polymer additives may be present to improve dyeability, soil repellence, crease resistance, hand, water repellence, wickability, strength, elongation, modulus, static propensity, or melting point of the fiber.

Many equivalent modifications will be apparent to those skilled in the art from a reading of the above without a departure from the inventive concept.

What is claimed is:

1. A linear, high molecular weight polycarbonamide wherein recurring carbonamide linkages are an integral part of the polymer chain wherein at least 90% by weight of the repeating units of the said polycarbonamide are of the formula:

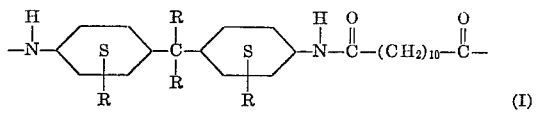
(I)

wherein R is the same or different member of the class consisting of hydrogen and methyl, at least 40% by weight of the diamino constituent of the repeating units of the Formula I being of a trans-trans stereoisomeric configuration, any copolymeric unit when present being a divalent organic radical containing from about 4 to about 20 carbon atoms, the said divalent radical being joined into the linear polymer chain is an integral part thereof by radicals from the class consisting of amino and carbonyl.

2. A linear, high molecular weight polycarbonamide consisting of repeating units of the formula:

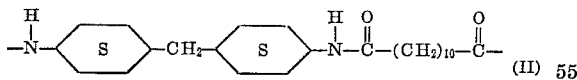
(II)

at least 40% by weight of the diamino constituent of the repeating units of the Formula II being of a trans, trans stereoisomeric configuration.

3. A fiber of the polymer of claim 2.
4. A film of the polymer of claim 2.
5. The polymer of claim 2 containing glass fibers embedded therein as a reinforcement element.
6. A linear, high molecular weight polycarbonamide wherein recurring carbonamide linkages are an integral part of the polymer chain and wherein at least 70% by weight of the repeating units of the said polycarbonamide are of the formula:

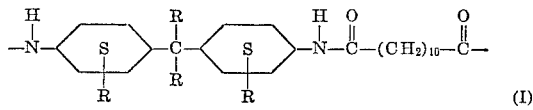
(I)

wherein R is the same or different member of the class consisting of hydrogen and methyl, at least 40% by weight of the diamino constituent of the repeating units of the Formula I being of a trans, trans stereoisomeric configuration, and up to 30% by weight of the repeating units of the formula:

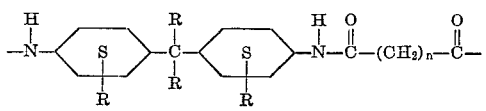

wherein R has the significance set forth above and $n$ is an integer of from 7 to 9 and 11 to 14.

7. The polymer of claim 1 wherein the divalent organic radical is hydrocarbon.

8. The polymer of claim 7 wherein at least about 55% by weight of the diamino constituent of the repeating units of the Formula I are of a trans, trans stereoisomeric configuration.

9. The polymer of claim 7 wherein at least about 70% by weight of the diamino constituent of the repeating units of the Formula I are of a trans, trans stereoisomeric configuration.

10. The polymer of claim 7 wherein R is hydrogen.

11. The polymer of claim 6 wherein at least 90% by weight of the repeating units of the said polycarbonamide are of Formula I.

12. The polymer of claim 1 wherein at least 95% by weight of the repeating units of said polycarbonamide are of Formula I.

13. The polymer of claim 1 wherein at least about 55% by weight of the diamino constituent of the repeating units of the Formula I are of a trans, trans stereoisomeric configuration.

14. The polymer of claim 1 wherein at least about 70% by weight of the diamino constituent of the repeating units of the Formula I are of a trans, trans stereoisomeric configuration.

15. The polymer of claim 2 wherein at least 55% by weight of the diamino constituent of the repeating units of the Formula II are of a trans, trans stereoisomeric configuration.

16. The polymer of claim 2 wherein at least about 70% by weight of the diamino constituent of the repeating units of the Formula II are of a trans, trans stereoisomeric configuration.

References Cited

UNITED STATES PATENTS

| 2,512,606 | 6/1950 | Bolton et al. | 260—78 |
| 2,585,163 | 2/1952 | Pease et al. | 260—78 |

FOREIGN PATENTS

| 894,171 | 3/1944 | France. |
| 851,128 | 1/1952 | Germany. |
| 714,519 | 9/1954 | Great Britain. |

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,393,210

July 16, 1968

Stanley B. Speck

It is certified that error appears in the above identified patent and that said Letters Patent are hereby corrected as shown below:

Column 2, line 38, "terminal" should read -- thermal --. Column 4, line 26, "as" should read -- has --. Column 9, TABLE VIII, fourth column, last line thereof, "1.7" should read -- 2.7 --.

Signed and sealed this 30th day of December 1969.

(SEAL)
Attest:

Edward M. Fletcher, Jr.
Attesting Officer

WILLIAM E. SCHUYLER, JR.
Commissioner of Patents